United States Patent
Mizumo (10) Patent No.: US 7,886,134 B2
(45) Date of Patent: Feb. 8, 2011

(54) LOOP ITERATION PREDICTION BY SUPPLYING PSEUDO BRANCH INSTRUCTION FOR EXECUTION AT FIRST ITERATION AND STORING HISTORY INFORMATION IN BRANCH PREDICTION UNIT

(75) Inventor: Hiroyuki Mizumo, Toshima Ku (JP)

(73) Assignee: Texas Instruments Incorporated, Dallas, TX (US)

( * ) Notice: Subject to any disclaimer, the term of this patent is extended or adjusted under 35 U.S.C. 154(b) by 12 days.

(21) Appl. No.: 12/329,103

(22) Filed: Dec. 5, 2008

(65) Prior Publication Data
US 2009/0150658 A1    Jun. 11, 2009

(30) Foreign Application Priority Data
Dec. 5, 2007    (JP) .............................. 2007-314439

(51) Int. Cl.
*G06F 9/38* (2006.01)
(52) U.S. Cl. ......................... 712/241; 712/239; 712/240
(58) Field of Classification Search ........................ None
See application file for complete search history.

(56) References Cited

U.S. PATENT DOCUMENTS

| | | | |
|---|---|---|---|
| 6,282,633 B1 * | 8/2001 | Killian et al. | 712/208 |
| 7,272,704 B1 * | 9/2007 | Nguyen et al. | 712/241 |
| 2005/0102659 A1 * | 5/2005 | Singh et al. | 717/150 |

FOREIGN PATENT DOCUMENTS

JP    2001-109627    4/2001

* cited by examiner

*Primary Examiner*—Kenneth S Kim
(74) *Attorney, Agent, or Firm*—Robert D. Marshall, Jr.; W. James Brady; Frederick J. Telecky, Jr.

(57) ABSTRACT

This invention combines a loop support mechanism and a branch prediction mechanism. After an instruction execution unit executes an end block instruction of a block repeat, the loop control unit branches to the first instruction in the loop and sends a pseudo branch instruction to the instruction execution unit. The instruction execution unit acts as if the last instruction in the block is an instruction for branching to the start address of the block. This is stored in the branch prediction unit and branch prediction is performed thereafter.

4 Claims, 5 Drawing Sheets

LOOP ITERATION PREDICTION BY SUPPLYING PSEUDO BRANCH INSTRUCTION FOR EXECUTION AT FIRST ITERATION AND STORING HISTORY INFORMATION IN BRANCH PREDICTION UNIT

CLAIM OF PRIORITY

This application claims priority under 35 U.S.C. 119(a) to Japanese Patent Application No. 2007-314,439 filed Dec. 5, 2007.

TECHNICAL FIELD OF THE INVENTION

The technical field of this invention is a processor and a signal processing method characterized by having a branch prediction mechanism and a loop support mechanism.

BACKGROUND OF THE INVENTION

A CISC (complex instruction set computer) type DSP (digital signal processor), which is a DSP with a highly complex instruction set, is equipped with a hardware resource that supports repeated structures in specific programs during DSP processing. It also has special instructions used for operating this hardware resource.

For example, when a filter operation or the like is carried out using a DSP, repeated processing is usually programmed. In order to carry out such a program efficiently, it is useful to adopt a special loop support mechanism for realizing the repetition without using a branch instruction.

When the loop support mechanism is used, the "repeated" operation (the operation of checking the number of repetitions and branching to the head of the loop if it is not finished) is automated. Ideally, the instructions during the loop can be executed without a cycle penalty.

The loop support mechanism is adopted in a DSP to express/retain the repetition structure during the program in a circuit at the address of the first/last instruction. It is also possible to use a special instruction for declaring a loop structure by initializing an address register that stores the address of the first/last instruction.

The address register of the loop support mechanism is initialized when the special instruction is executed by an instruction execution unit. The number of repetitions of the loop is indicated by initializing a number of repetitions register in advance using another instruction.

Then, the loop support mechanism interferes with instruction fetch so that repetition of the loop is performed without delay when the DSP is carrying out the loop. More specifically, the loop support mechanism indicates the loop head address where the instruction to fetch next is located when fetching reaches the loop end. Depending on this indication, the DSP can prepare the instruction to execute following the loop structure. In this way, the essential condition for repeating without any cycle penalty can be satisfied. Such a DSP can also have an instruction queue for the reason that instructions of variable length are used or the fetch width is not the instruction width.

Some DSPs developed in recent years also have a branch prediction mechanism used to reduce the number of cycles needed for executing control code in order to adapt to the case in which the proportion of DSP processing is reduced while the proportion of processing control code (a program or routine mainly composed of condition judgments and branching) is increased.

In the aforementioned CISC type of DSP, however, it is required to have both a loop support mechanism and a branch prediction mechanism in order to improve processing efficiency when the proportion of control code processing is increased.

However, since both the loop support mechanism and the branch prediction mechanism interfere with instruction fetch, if they are simply combined, optimal advanced instruction fetching may not be possible when these two mechanisms compete with each other. A complicated mechanism is needed to coordinate the two mechanisms to avoid this problem.

The objective of the present invention is to solve the aforementioned problem by providing a processor and a signal processing method that can process advanced fetching of a program in an optimal manner with a simple constitution when both a loop support mechanism and a branch prediction mechanism are present.

SUMMARY OF THE INVENTION

In order to solve the problems of the aforementioned conventional technology and realize the aforementioned objective, the first embodiment provides a processor having an instruction fetch unit that obtains instructions sequentially, an instruction execution unit that executes the instructions obtained by the instruction fetch unit, a branch prediction unit that stores the branch information regarding the result of branching depending on a branch instruction when the branch instruction is executed by the instruction execution unit, predicts the branch destination when the branch instruction is obtained by the instruction fetch unit, and controls the instruction fetch unit such that instructions are obtained sequentially from the predicted branch destination, and a loop control unit that indicates to the instruction fetch unit a loop beginning branch for branching from the last instruction to the first instruction of an instruction group during initial execution when the instruction group is executed repeatedly in the instruction execution unit, and invalidates branching from the last instruction to the first instruction of the instruction group during final execution of the instruction group.

In the processor disclosed in the first embodiment, when the instruction execution unit executes the repeated structure (loop) in a program, the loop control unit indicates to the instruction fetch unit a loop forming control (branch for starting a loop) for branching from the last instruction of that loop to the first instruction in the first cycle (execution), and at the same time provides a pseudo branch instruction to the instruction execution unit. When the instruction fetch unit follows the loop beginning indication, the processor can branch from the last instruction of the loop to the first instruction.

Then when the instruction execution unit recognizes the pseudo branch instruction, although no branching operation will be performed, the fact that a branch instruction is present will be stored in the branch prediction unit in the same way as would the normal branch instruction. The branch prediction unit constantly stores branch information regarding the branching result depending on the branch instruction in the instruction execution unit, predicts the branch destination in the event a branch instruction is obtained by the instruction fetch unit, and controls the instruction fetch unit in order to obtain instructions sequentially from the predicted branch destination. The branch prediction unit stores the presence of the loop according to the pseudo branch instruction.

In this way, repeated processing depending on the repeat instruction can be realized by the branch prediction processing carried out by the branch prediction unit, and complicated coordination between the repetition (loop) support mechanism and the branch prediction mechanism becomes unnecessary, allowing the processor to be realized by a simple constitution.

Preferably, the loop control unit disclosed in the first embodiment indicates to the instruction fetch unit a loop ending branch for branching from the last instruction to the next instruction in the instruction group during final execution of the instruction group.

In this way, loop ending processing can be realized.

Preferably, the branch prediction unit of the processor disclosed in the first embodiment does not store the branch information for ending the loop.

In this way, when the same loop is to be carried out next, even if the branch control for loop formation is not indicated, branching from the last instruction of the loop to the first instruction can be carried out automatically depending on the prediction performed by the branch prediction unit.

Preferably, the loop control unit of the processor disclosed in the first embodiment does not indicate the loop beginning branch to the instruction fetch unit when the branch prediction unit predicts branching according to the pseudo branch instruction used for repeated processing during initial execution of the instruction group.

Preferably, the processor disclosed in the first embodiment also has a memory that stores an instruction obtained by the instruction fetch unit until the instruction is supplied to the instruction execution unit, and the loop control unit erases the instructions in the instruction group from among the instructions stored in the memory when it indicates the loop ending branch to the instruction fetch unit.

The second embodiment provides a signal processing method that obtains instructions sequentially using an instruction fetch unit and executes the instructions using an instruction execution unit, characterized by having a storage step for storing the branch information regarding the result of branching depending on a branch instruction when the branch instruction is executed, a prediction step for predicting the branch destination based on the branch information stored in the storage step, a step for obtaining the instructions sequentially from the branch destination predicted in the prediction step, a loop beginning control step that indicates to the instruction fetch unit a loop beginning branch for branching from the last instruction to the first instruction of an instruction group during the initial execution when the instruction group is executed repeatedly in the instruction execution unit, and a loop ending step that invalidates the branching from the last instruction to the first instruction of the instruction group during final execution of the instruction group.

The processor disclosed in the third embodiment has an instruction fetch unit including a program counter for memory access, an instruction execution unit, a loop control unit for controlling execution of the block repeat operation (loop (repeated operation) indicated by the block repeat instruction) based on a block repeat instruction, and a branch prediction unit that monitors the address value of the program counter of the instruction fetch unit and provides the address of the branch destination to the instruction fetch unit when instruction branching is predicted. The processor executes the instructions by a pipeline processing and carries out the following steps: a step in which the branch prediction unit learns that the instruction at the last address of an instruction group as the object of the block repeat operation is a branch instruction to the header address of the instruction group when the block repeat operation is initially carried out, and a step in which the branch prediction unit provides to the instruction fetch unit the address of the header of the instruction group as the address of the branch destination when the address value of the program counter of the instruction fetch unit becomes the last address of the instruction group when the block repeat operation is carried out for the second time and thereafter.

BRIEF DESCRIPTION OF THE DRAWINGS

These and other aspects of this invention are illustrated in the drawings, in which:

FIG. 4(A) illustrates the address indicated by fetch program counter PC-F, FIG. 4(B) illustrates the address written into the instruction register IR of the instruction execution unit, FIG. 4(C) illustrates the state of block repeat active flag AF stored in register BRAF, FIG. 4(D) illustrates the address stored in register RSA, FIG. 4(E) illustrates the address stored in register REA, and FIG. 4(F) illustrates the value of block repeat counter BRCV stored in register BRC.

DETAILED DESCRIPTION OF PREFERRED EMBODIMENTS

In the Figures: element 1 represents a DSP; element 11 a memory; element 13 an instruction fetch unit; element 15 a queue; element 17 a dispatch unit; element 19 an instruction execution unit; element 21 a branch prediction unit; element 31 an adder; element 33 a selector; element 37 a memory access unit; element 41 a comparator; element 49 a controller; element 51 a selector; PC-F a fetch program counter; PC-D a dispatch program counter.

The present invention provides a processor and a signal processing method that can coordinate both the loop support mechanism and branch prediction mechanism with a simple constitution and can perform optimal advanced instruction fetch.

In the following, the technology related to an embodiment of the present invention will be explained.

Figure 1:
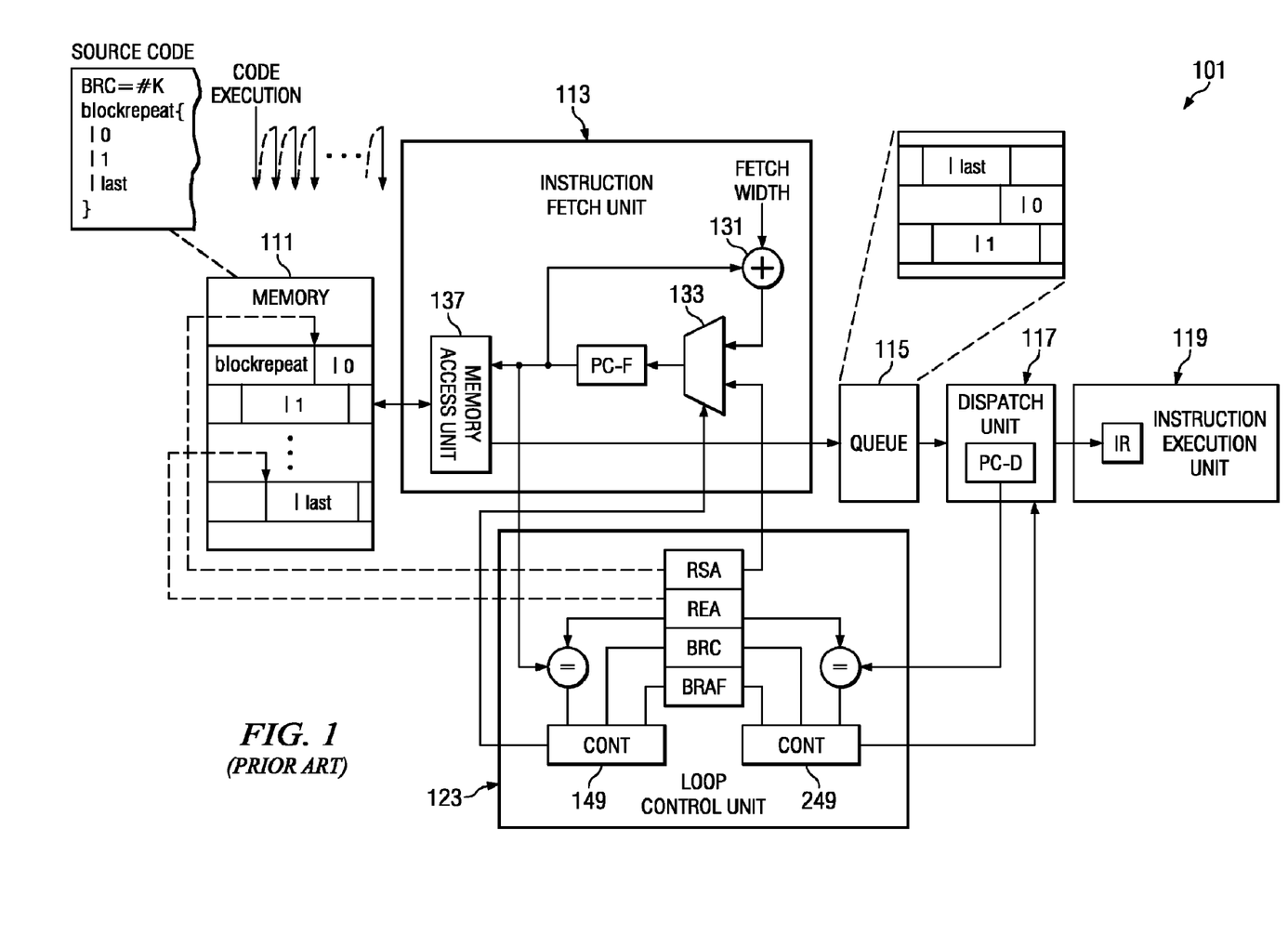
FIG. 1 shows a block diagram of a DSP equipped with a loop support mechanism disclosed in the technology related to the embodiment of the present invention (prior art)

FIG. 1 is a block diagram for a prior art DSP 101 equipped with the loop support mechanism disclosed in the related technology.

In DSP 101 shown in FIG. 1, when a loop structure declaration instruction (block repeat instruction) is executed in instruction execution unit 119, a repeated structure (loop) is recognized. In this way, the start address SA within memory 111 of the loop is written into register RSA in loop control unit 123 and the end address EA within memory 111 is written into register REA. The block repeat active flag AF stored in register BRAF is rewritten to "1" indicating the active state. The block repeat count value BRCV indicated by a block repeat instruction at the head of the repeated block in memory 111 indicating the number of repetitions (number of loops) is written into register BRC in advance as the initial value.

In normal operation adder 131 increments the prior fetched address from fetch program counter PC-F by the fetch width. As known in the art, the fetch width may be variable. This sum address is loaded into fetch program counter PC-F via selector 133. Memory access unit 137 uses this next address to fetch the next instruction from memory 111.

Loop control unit 123 is a loop support mechanism that is includes controllers 149 and 249. Loop control unit 123 enables repeated operation with little cycle penalty.

Controller 149 determines whether repetition conditions are met by checking whether block repeat active flag AF shows the active state and whether the block repeat counter value BRCV is not "0" when the address indicated by fetch program counter PC-F matches the end address EA of the loop. If controller 149 finds that the repetition conditions are met, it provides the start address SA of the loop from register RSA to selector 133 of instruction fetch unit 113. In this way, before the loop repetition condition is reached in instruction execution unit 119, the instruction at start address SA in the block is fetched from memory 111 into queue 115 by memory access unit 137.

The processing for comparing whether the address indicated by the fetch program counter PC-F is consistent or inconsistent with the end address EA of the loop checks whether the end of the instruction present at end address EA is fetched instead of checking whether the values are consistent. For example, controller 149 checks whether "EA+maximum instruction length−1" addresses is fetched.

Controller 249 determines whether the repetition (loop) ending conditions are met by checking whether block repeat active flag AF indicates the inactive state and whether block repeat counter value BRCV is "0" when the address indicated by dispatch program counter PC-D matches the end address EA of the loop (block repeat). If controller 249 finds that the repetition ending conditions are met, it discards the instructions in the loop stored in queue 115 and dispatch unit 117. Dispatch program counter PC-D shows the address of the instruction output from dispatch unit 117 to instruction execution unit 119. Thus the address of the sum of the fetch width and the end address EA is selected instead of the start address SA from loop control unit 123 by selector 133. In this way, the instruction after the loop is fetched by memory access unit 137 from memory 111 and stored in queue 115.

As described above, loop control unit 123 of DSP 101 realizes a loop can with little cycle penalty.

Figure 2:
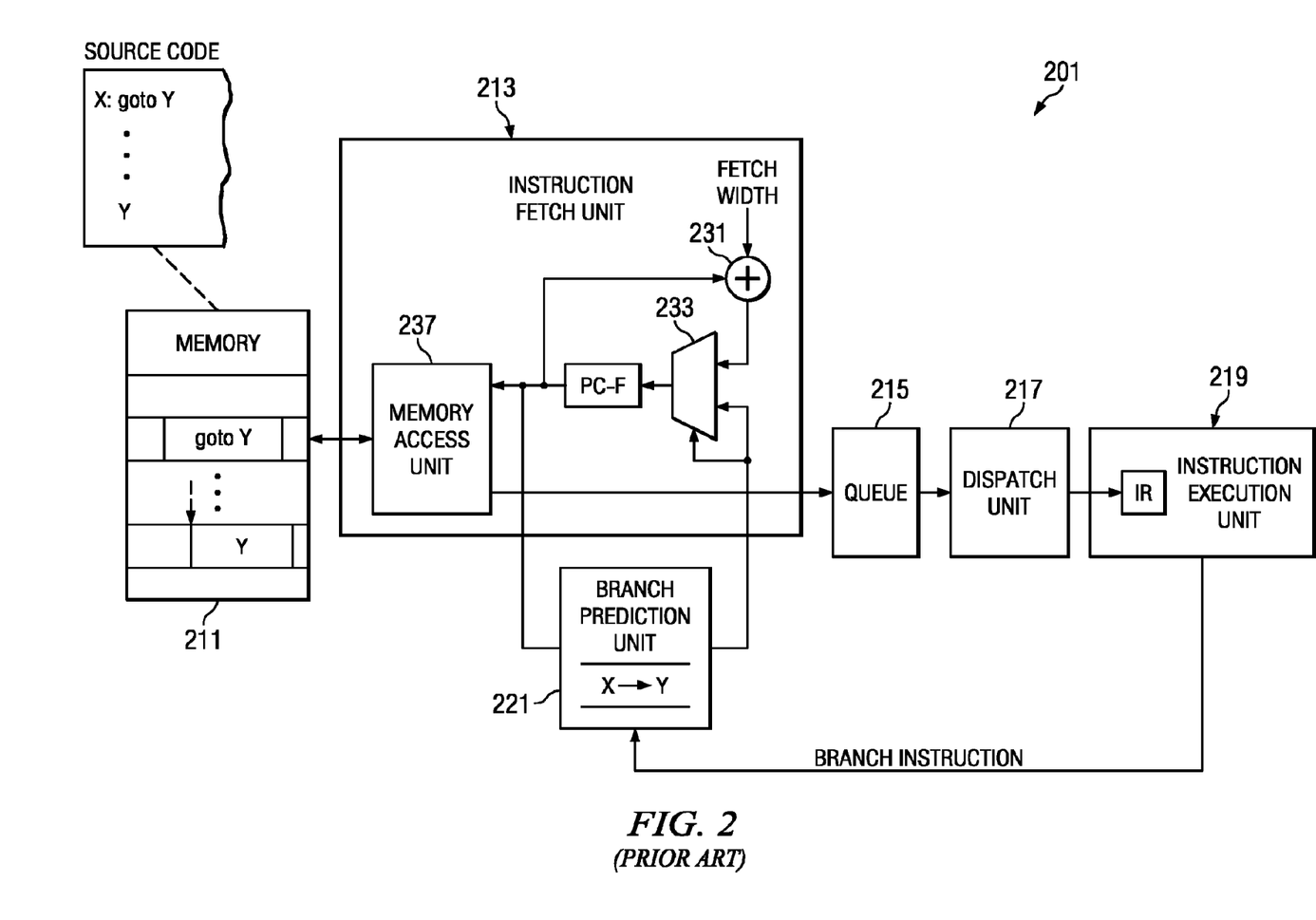
FIG. 2 shows a block diagram of a DSP equipped with a branch prediction mechanism disclosed in the technology related to the embodiment of the present invention (prior art)

FIG. 2 is a block diagram for a prior art DSP 201 equipped with a branch prediction mechanism disclosed in the related technology.

In DSP 201 shown in FIG. 2, the address of a branch instruction executed by instruction execution unit 219 is stored in branch prediction unit 221. Instruction execution unit 219 provides an indication of a branch instruction to branch prediction unit 221 to facilitate this identification. Then branch prediction unit 221 constantly monitors the address indicated by fetch program counter PC-F and performs branch prediction based on its history. Branch prediction unit 221 switches the address selected by selector 233 based on the result of the branch prediction.

In other words, branch prediction unit 221 stores the branch instructions that have been executed by instruction execution unit 219 in the past, constantly compares the fetch address with the stored address, and predicts whether instruction execution unit 219 will execute the next branch instruction. When a branch is predicted, branch prediction unit 221 performs control so that fetch program counter PC-F indicates the address of the branch destination via selector 233.

In this way, before the branch instruction is executed in instruction execution unit 219, the instruction used following the branch can be fetched and stored in queue 215. When branching is predicted, branch latency can be reduced without the branch processing being carried out by instruction execution unit 219.

On the other hand, if no branching is predicted, for example, if the instruction at the next address will be executed without branching, instruction execution unit 219 will erase the instructions fetched into queue 215 and dispatch unit 217 as a result of the branch prediction, and will perform control so that fetch program counter PC-F indicates the next address. In this case, a timing latency results from fetching the instruction at the next address from memory 11 and sending it to instruction execution unit 219 via queue 215 and dispatch unit 217. This latency occurs because of the misprediction of the branch.

Whether a branch is taken is determined when instruction execution unit 219 performs a conditional operation corresponding to the branch instruction.

The branching predicted by branch prediction unit 221 is stored in a special FIFO (first in first out) queue 215 while it is reflected in fetch program counter PC-F as described above. When the branch instruction is sent from dispatch unit 217 to instruction execution unit 219, the prediction information in the FIFO is transferred along with the instruction. The instruction execution result is compared with the prediction in instruction execution unit 219. If it is found that the prediction is mistaken, branching will be explicitly carried out accompanied by a latency of several cycles. The value depends on the instruction and is often at least five cycles depending on the pipeline depth.

As described above, a branch instruction can be executed with little cycle penalty by furnishing DSP 201 with branch prediction unit 221.

In the following, the DSP disclosed in an embodiment of the present invention will be explained.

The DSP disclosed in this embodiment jointly contains a branch prediction mechanism and a loop support mechanism in a simple constitution.

Figure 3:
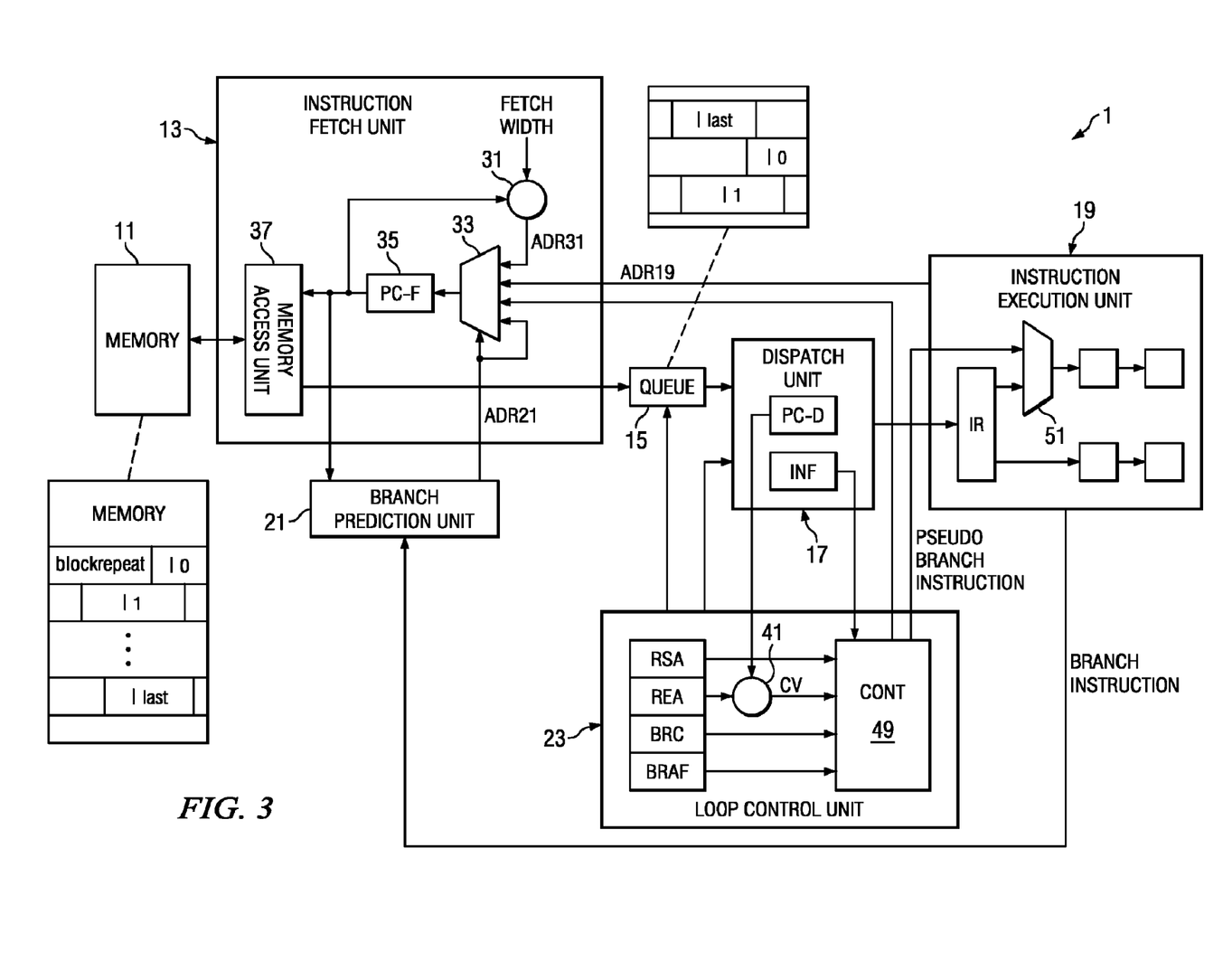
FIG. 3 shows a block diagram of the DSP disclosed in the embodiment of the present invention.

FIG. 3 shows the block of DSP 1 disclosed in the embodiment of the present invention.

As shown in FIG. 3, DSP 1 has memory 11, instruction fetch unit 13, instruction queue 15, dispatch unit 17, instruction execution unit 19, branch prediction unit 21, and loop control unit 23.

In this case, instruction fetch unit 13 is an example of the instruction fetch unit disclosed in the present invention, and instruction execution unit 19 is an example of the instruction execution unit disclosed in the present invention. Also, branch prediction unit 21 is an example of the branch prediction unit disclosed in the present invention, and loop control unit 23 is an example of the loop control unit disclosed in the present invention. The instruction fetch unit may also include an instruction queue and dispatch unit.

As shown in FIG. 3, DSP 1 is equipped with both branch prediction unit 21 and loop control unit 23, and can realize coordination between branch prediction and loop control with a simple constitution.

In DSP 1, after instruction execution unit 19 executes a block repeat instruction (loop declaration instruction), when the address of the last instruction in the loop (instruction group as the object of the block repeat operation) is indicated by dispatch program counter PC-D (when the last instruction is sent to instruction execution unit 19), loop control unit 23 indicates branching to the beginning of the loop to instruction fetch unit 13, and the process is branched to the instruction at the beginning of the loop. In this way, fetch program counter PC-F indicates the address SA of the first instruction of the loop. At the same time, loop control unit 23 sends a pseudo branch instruction to instruction execution unit 19.

Then the pseudo branch instruction is handled in instruction execution unit 19 as if it attaches to the last instruction of the loop at address EA. The fact of branching to the first instruction in the loop at address SA is stored in branch prediction unit 21.

After that, when fetch program counter PC-F indicates the address EA of the last instruction in the loop again, branch prediction unit 21 predicts branching, and the address SA of the first instruction in the loop is indicated to fetch program counter PC-F via selector 33.

As described above, both branch prediction and loop support are performed in DSP 1 with the aid of fetch program counter PC-F. A pseudo branch instruction is provided in the first cycle (execution) of the loop. After that, branching to the beginning from the end of the loop is predicted by branch prediction unit 21 so that the loop processing is absorbed into the branch prediction processing. In this way, no complicated coordination is needed between the branch prediction mechanism and the loop support mechanism. The coordination between these two mechanisms can be realized by a simple configuration.

In the following, each constituent element shown in FIG. 3 will be explained.

Memory 11 is a SRAM (static RAM) or the like that stores the object codes of the program executed by instruction execution unit 19. A block repeat instruction (loop structure declaration instruction) indicating the fact that a group of instructions (codes) are executed repeatedly for a prescribed number of times is included among the object codes.

As previously noted, the instruction included in the codes may have a variable length.

Instruction fetch unit 13 has adder 31, selector 33, fetch program counter 35, and memory access unit 37.

Adder 31 outputs address ADR 31, calculated by adding a prescribed fetch width to the address indicated by fetch program counter 35 to selector 33. The is the address of the next instruction in the absence of loops or branches.

Selector 33 selects one address from among address ADR31 of adder 31, address ADR19 obtained from instruction execution unit 19, address ADR21 obtained from branch prediction unit 21, and the address obtained from loop control unit and outputs the selected address to fetch program counter PC-F.

Memory access unit 37 fetches (reads out) the instruction with the fetch width as a unit from the address among the addresses in memory 11 that is indicated by fetch program counter PC-F. Memory access unit 37 outputs the instruction to queue 15.

Queue 15 stores the instruction array, composed of consecutive instructions with variable length input from memory access unit 37, until dispatch unit 17 outputs the instructions individually to instruction execution unit 19.

That is, since the unit transferred (fetched) from memory access unit 37 is not an instruction, queue 15 is set to adjust appropriately so that instructions are output to dispatch unit 17. Queue 15 inputs/outputs instructions in FIFO form.

Dispatch unit 17 recognizes the instruction at the beginning of an instruction array input from queue 15, adjusts its length, and outputs the instruction to instruction execution unit 19. At the same time, it sends the length of that instruction to queue 15 and outputs the next instruction.

In DSP 1, as described above, depending on the function of branch prediction unit 21, the branch destination or the instruction at the beginning of the loop is first fetched into queue 15 without checking the branch condition or the loop condition. In this case, after the branch condition or loop condition is finally judged in dispatch unit 17 or loop control unit 49, an appropriate instruction according to whether the prediction is correct or not is dispatched and sent to instruction execution unit 19 so that the program can be executed correctly.

Dispatch unit 17 has a dispatch program counter PC-D and outputs to loop control unit 23 the address of the instruction to be output to instruction execution unit 19.

Instruction execution unit 19 decodes the instruction input from dispatch unit 17 and carries out processing based on the decoded result. Instruction execution unit 19, for example, multiplexes the branching unit and operation unit and executes the instructions in them, respectively. Instruction execution unit 19 computes an actual branch address either confirming or disaffirming the branch prediction of branch prediction unit 21. This actual branch address ADR 19 is supplied to one input of selector 33. Branch prediction unit 21 causes selector 33 to select ADR 19 upon a misprediction of the branch address. This could be a branch taken when predicted not taken or a branch not taken when predicted taken. In FIG. 3, only the branching unit is schematically shown.

Instruction execution unit 19, for example, may execute two instructions in one cycle by being equipped with two pipelines. This multiple instruction execution capability is known as superscalar processing.

Instruction execution unit 19 is equipped with a selector 51 following the instruction register IR of one pipeline. Selector 51 usually selects the instruction input from dispatch unit 17 into instruction register IR and sends it to the pipeline in the next stage. On the other hand, when an instruction from loop control unit 23 (pseudo branch instruction) is input, selector 51 selects it and sends it to the next pipeline.

Instruction execution unit 19 decodes the instruction with variable length input from dispatch unit 17 and calculates the address of the data to use (effective address). Instruction execution unit 19 then reads out the data to use. After that, instruction execution unit 19 carries out the operation required by the instruction and outputs the result.

Branch prediction unit 21 stores the address of the branch instruction executed by instruction execution unit 19 and the address of the branch destination of the branch instruction.

Branch prediction unit 21 monitors the address indicated by fetch program counter PC-F and predicts the branching based on the address of fetch program counter PC-F, the address of the branch instruction stored, and the address of the branch destination. More specifically, when fetch program counter PC-F indicates the address of the stored branch instruction that has executed branching in the past, branch prediction unit 21 controls selector 33 so that fetch program counter PC-F indicates the address of the branch destination in the past with reference to the stored address and the like.

In this way, before the branch instruction is executed in instruction execution unit 19, the instruction used in the case of branching can be fetched. When a branch is correctly predicted, since the instruction of the branch destination has already been stored in queue 15, branching latency is limited without performing the branch processing by instruction execution unit 19.

On the other hand, if no branching is predicted (if the instruction at the next address will be executed without branching), instruction execution unit 19 will erase the instructions fetched into queue 15 and dispatch unit 17 as a result of the branch prediction, and will control so that fetch program counter PC-F indicates the next address.

When no branching is predicted, a timing latency occurs from fetching the instruction at the next address from memory 11 and sending it to instruction execution unit 19 via queue 15 and dispatch unit 17.

Whether a branching is predicted is determined by branch prediction unit 21 based upon a comparison with the supplied branch prediction information instead of performing a conditional operation process corresponding to the branch instruction in instruction execution unit 19.

Next, however, the case will be considered in which a "pseudo branch instruction" is sent to instruction execution unit 19 by loop control unit 23, the start signal SA of the loop is output from loop control unit 23 to selector 33, and the address is set in fetch program counter PC-F.

In this case, instruction execution unit 19 (branching unit) indicates whether the last instruction of the loop at address EA is the branch instruction to branch prediction unit 21. In this way, the fact of branching to the first command of the loop corresponding to address SA is stored in branch prediction unit 21.

Then, when fetch program counter PC-F indicates the address EA of the last instruction of the loop again, branch prediction unit 21 predicts the branching and causes fetch program counter PC-F to indicate address SA of the first instruction in the loop via selector 33. In this way, the loop is realized by means of branch prediction.

Loop control unit 23 has registers RSA, REA, BRC, BRAF, and comparator 41. The start address SA of the loop is written into register RSA. The end address EA of the loop is written into register REA. The block repeat counter BRCV is written into register BRC. The block repeat active flag AF is written into register BRAF.

Comparator 41 compares the value indicated by dispatch program counter PC-D with end address EA of the loop read from register REA. If they are the same, a comparison value indicating logic value "1" is output to controller 49.

Controller 49 performs loop control processing based on the start address SA of the repeated operation stored in register RSA, comparison value CV sent from comparator 41, block repeat counter value BRCV stored in register BRC, and block repeat active flag AF stored in register BRAF.

More specifically, since a loop is formed when comparison value CV initially switches from logic value "0" to "1" (when the last instruction of the loop is sent to instruction execution unit 19) after execution of a block repeat instruction (loop declaration instruction) is started (after active flag AF switches from logic value "0" to "1"), controller 49 controls selector 33 so that fetch program counter PC-F indicates the address SA of the first instruction of the loop. In other words, address SA is supplied as the next fetch address. Also, a "pseudo branch instruction" indicating branching to the start address SA of the loop is output to the selector 51 of instruction execution unit 19.

Instruction execution unit 19 acts as if it has executed the "pseudo branch instruction," and that fact is learned by branch prediction unit 21. In this way, when fetch program counter PC-F indicates the address EA next, branching to address SA is predicted automatically by branch prediction unit 21. Therefore, there is no need for loop control unit 23 to have an independent mechanism that constantly monitors fetch program counter PC-F and returns from the end address EA of the block to the start address SA in order to realize the loop.

When the last instruction of the loop is output from dispatch unit 17 to instruction execution unit 19, controller 49 decrements the block repeat counter value BRCV stored in register BRC by "1."

Controller 49 determines whether the non-repeat conditions (loop ending conditions) are met by checking whether block repeat counter value BRCV is "0" and active flag AF has a logic value of "1" at the time that comparison value CV switches from logic value "0" to "1" (when the last instruction of the loop is sent to instruction execution unit 19). If branching from end address EA to start address SA is predicted and it is found by controller 49 that the ending conditions are met, the controller indicates advancing to the address after the end address EA of the loop to instruction fetch unit 13 in order to cancel the prediction. In this way, processing can exit the loop.

When the non-repeat conditions are met, controller 49 erases (refreshes) the instructions corresponding to the loop remaining in queue 15 and dispatch unit 17.

In the following, an operation example pertaining to the block repeat instruction (loop declaration instruction) and execution of the loop by DSP 1 shown in FIG. 3 will be explained.

Figure 4:
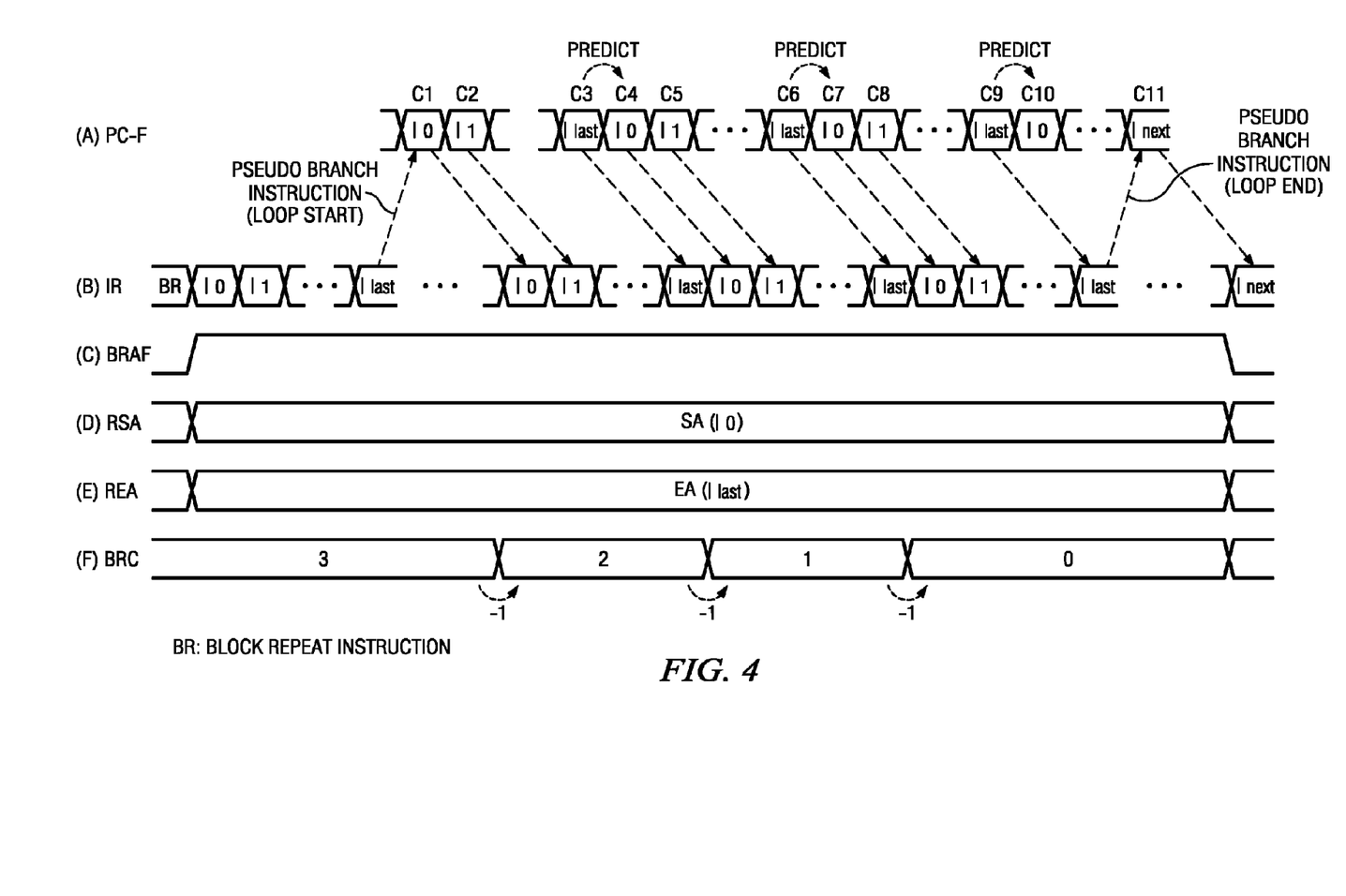
FIG. 4 is a timing chart explaining an operation example for the DSP shown in FIG. 3, where

FIG. 4 is a timing chart explaining the operation example for DSP 1 shown in FIG. 3.

FIG. 4(A) is a diagram illustrating the address indicated by fetch program counter PC-F. FIG. 4(B) is a diagram illustrating the address written into the instruction register IR of instruction execution unit 19. FIG. 4(C) is a diagram illustrating the state of block repeat active flag AF stored in register BRAF. FIG. 4(D) is a diagram illustrating the address stored in register RSA. FIG. 4(E) is a diagram illustrating the address stored in register REA. FIG. 4(F) is a diagram illustrating the value of block repeat counter BRCV stored in register BRC.

In FIG. 4, "I" means instruction.

Figure 5:
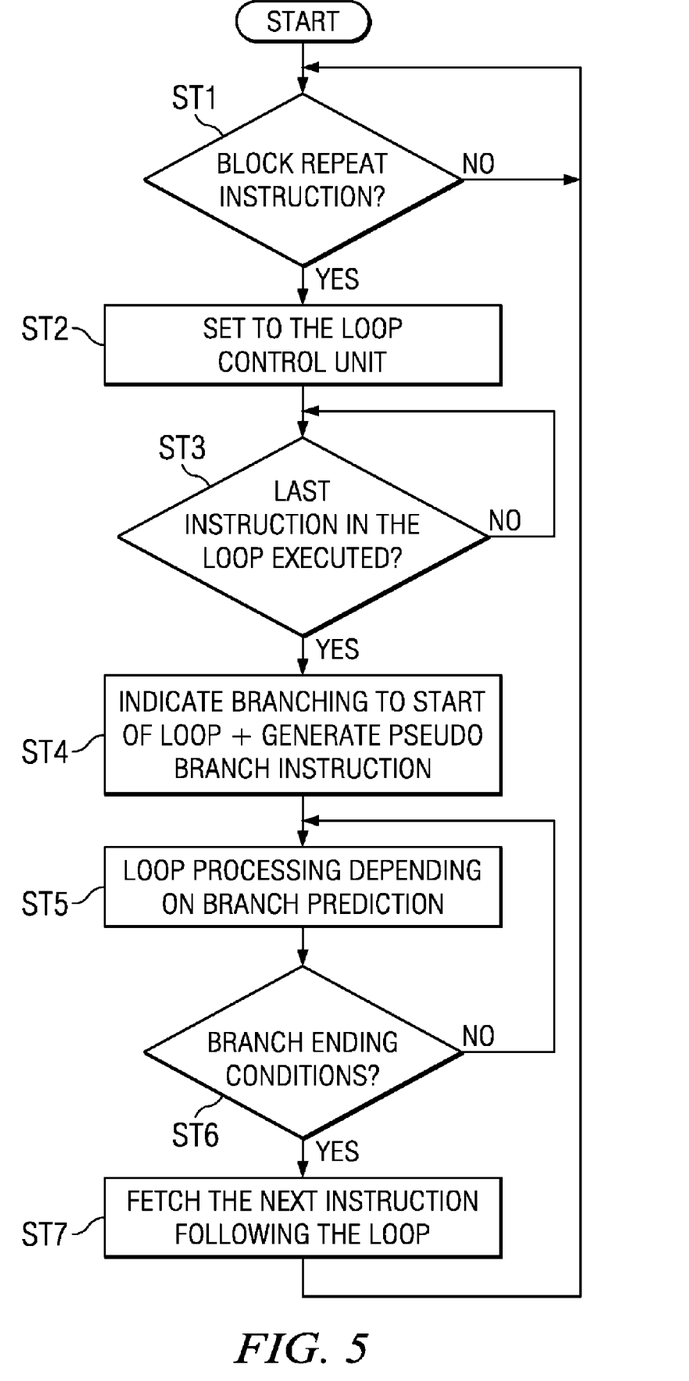
FIG. 5 is a flow chart explaining the operation example for DSP 1 shown in FIG. 3.

FIG. 5 is a flow chart explaining an operation example for DSP 1 shown in FIG. 3.

For example, in instruction execution unit 19, in the state when non-control instructions other than branch instruction are executed sequentially, the address ADR 31 sent from adder 31 is selected by selector 33 and is set in fetch program counter PC-F.

Memory access unit 37 accesses memory 11 based on the address indicated by fetch program counter PC-F to read an instruction from memory 11 and store it in queue 15. At that time, since address ADR 31 equals the value obtained by sequential addition by the fetch width, instructions are read from memory access unit 37 to queue 15 with the fetch width as a unit.

Dispatch unit 17 then reads out an instruction in FIFO form from queue 15 and stores it in the instruction register IR of instruction execution unit 19.

Instruction execution unit 19 executes the instruction stored in instruction register IR.

Thus DSP 1 sequentially supplies instructions, read out from memory 11 based on fetch program counter PC-F, to instruction execution unit 19 via queue 15 and dispatch unit 17 for execution in instruction execution unit 19.

The flow chart determines if a block repeat instruction BR (loop declaration instruction) is output from dispatch unit 17 to instruction execution unit 19 a step ST1. If not (no at step ST1), then step ST1 repeats. If so (yes at step ST1), instruction execution unit 19 executes block repeat instruction BR is step ST2.

When instruction execution unit 19 executes block repeat instruction BR and recognizes a repeated structure (loop) in step ST2, the block repeat active flag AF stored in register BRAF in loop control unit 23 is set to logic value "1." At the same time, instruction execution unit 19 writes the start address SA of the loop (a series of instruction groups as the object of the block repeat operation) into register RSA in loop control unit 23. Instruction execution unit 19 also writes end address EA of the loop into register REA.

The flow chart checks to determine if the program has reached the last instruction in the loop in step ST3. The identify of this last instruction is determined by the original block repeat instruction. If not (no at step ST3), then normal execution continues while repeatedly checking for the last instruction in the block in step ST3. If so (yes at step ST3), then the flow chart advances to the pseudo branch instruction in step ST4. This determination is made by controller 49 of loop control unit 23. When controller 49 of loop control unit 23 detects the when comparison value CV initially switches from logic value "0" to "1" (when the last instruction of the loop is sent to instruction execution unit 19) after execution of the block repeat instruction (after active flag AF switches from logic value "0" to "1"), it indicates branching to the start address SA of the loop to instruction fetch unit 13 at step ST4 via pseudo branching. As noted in FIG. 5 this next address is the sum of the start of loop address SA as indicated by the pseudo branching.

Start address SA output by loop control unit 23 is selected by selector 33 in instruction fetch unit 13, and fetch program counter PC-F indicates the address SA a time C1 in FIG. 4.

At the same time the branching is indicated, the controller 49 of loop control unit 23 also outputs a "pseudo branch instruction" to selector 51 of instruction execution unit 19 so that branch predictor 21 can learn of the branching (step ST4). This pseudo branch instruction is retained by branch prediction unit 21.

After that, selector 33 selects address ADR 31 and outputs it to fetch program counter PC-F. The instructions in the loop are fetched sequentially by memory access unit 37 (step ST5).

Step ST6 determines if the branch end conditions are met. If not (no at step ST6), then sequential loop operation continues in step ST5. If so (yes at step ST6), then operation advances to the next instruction following the loop in step ST7. When fetch program counter PC-F next indicates the end address EA of the loop, branching to address SA is predicted automatically by branch prediction unit 21. That is, the start address SA of the loop is output from branch prediction unit 21 to selector 33. It is selected and stored in fetch program counter PC-F.

In this way, fetch program counter PC-F indicates the start address SA of the loop after the end address EA of the loop between times C3 and C4 in FIG. 4.

Each time that fetch program counter PC-F indicates the end address EA of the loop, branching is predicted by branch prediction unit 21, and fetch program counter PC-F is controlled to indicate address SA after address EA.

In this way, fetching of the loop is realized depending on the branch prediction of branch prediction unit 21 instead of by control performed by loop control unit 23 (step ST5).

During the execution of the loop, when the last instruction of the loop is output from dispatch unit 17 to instruction execution unit 19, controller 49 of loop control unit 23 decrements the block repeat counter value BRCV stored in register BRC by "1."

Controller 49 constantly checks whether the non-repeat conditions are met by determining whether block repeat counter value BRCV is "0" and active flag AF has the logic value "1" at the time that comparison value CV switches from logic value "0" to "1" (when the last instruction of the loop is sent to instruction execution unit 19) at step ST6.

When controller 49 determines that the non-repeat conditions are met but repetition is predicted during fetch, loop control unit 23 will instruct instruction fetch unit 13 to branch to the instruction Inext of the next address after the last address EA of the loop (step ST7) at time C11 in FIG. 4.

Memory access unit 37 then fetches instruction Inext from memory 11 based on the address and outputs the instruction to queue 15. In this way, after a delay of several cycles, instruction Inext is written into instruction register IR of instruction execution unit 19 and is executed.

When controller 49 cancels the repetition prediction, it will erase (refresh) the instructions corresponding to the loop remaining in queue 15 and dispatch unit 17.

In this embodiment, when the repetition prediction is cancelled, storage of the branch instruction for repetition in branch prediction unit 21 is not cancelled. In this way, the actual storage of a "pseudo branch instruction" corresponding to the last instruction of the loop is effective in branch prediction unit 21 as is. When the same loop is executed again, branching from the end address EA of the loop to the start address SA will be predicted, and the "loop formation branch" of step ST4 in FIG. 5 becomes unnecessary. This further reduces the latency. In this case, a loop that repeats an N-cycle main process by M times can be realized in "M×N+5" cycles. The 5 cycles are the cycles associated with the processing for exiting from the loop.

As explained above, in the case of performing repeated operations in DSP 1, a "pseudo branch instruction" branching to the start address SA of the loop is generated at the position of the last instruction in the first cycle (execution) of the loop, and the branching is learned by branch prediction unit 21. Thus, the first instruction of the loop can in the later processing be fetched automatically immediately after the last instruction in the loop is fetched (repeated processing) according to the branch prediction performed by branch prediction unit 21, instead of from control by loop control unit 23. In other words, by absorbing the loop processing into the branch prediction processing in DSP 1, even if the processor has both a branch prediction mechanism and a loop support mechanism, there is no need for complicated coordination between the two mechanisms, which can be coordinated with a simple configuration.

The present invention is not limited to the embodiment described above.

In other words, those skilled in this field can make various changes, combinations, sub-combinations, and substitutions with respect to the constituent elements in the aforementioned embodiment within the technical scope or its equivalent scope of the present invention.

For example, in the aforementioned embodiment, the storage of branching for loop formation is not eliminated from branch prediction unit 21. However, the storage can also be eliminated. In this case, when the block repeat instruction is executed the next time, the processing is carried out in the same way as shown in FIGS. 4 and 5. In the described embodiment instructions of the program have a variable length in the embodiment. The instructions may alternatively have a fixed length.

The present invention can be applied to systems using both a branch prediction mechanism and a loop support mechanism.

What is claimed is:

1. A digital data processor operable to execute conditional branch instructions to branch to a branch address upon satisfaction of branch condition and a block repeat instruction specifying a number of times to execute a block of instructions from a block start address to a block end address comprising:

an instruction fetch unit including
- a program counter fetch register storing a next instruction address to be fetched from a memory having an input for storing a specified address and an output generating said address stored therein,
- an adder having a first input connected to said output of said program counter fetch register, a second input receiving an instruction fetch width and an output generating a sum of said first and second inputs, and
- a selector having a first input connected to said output of said adder, second and third inputs, a control input and an output, said selector connected a selected one of said first, second and third inputs to said output dependent upon a control signal at said control input;

an instruction execution unit connected to said instruction fetch unit performing data processing operations corresponding to instructions fetched by said instruction fetch unit, that executes the instructions obtained by said instruction fetch unit, a loop control unit including
- a block start address register storing the address of a start instruction of a repeated block of instructions,
- a block end address register storing the address of an end instruction of a repeated block of instructions,
- a comparator having a first input connected to said block end address register, a second input responsive to an address of an instruction next to be dispatched to said instruction execution block and an output indicating whether the first and second inputs match,
- a block count register storing a number of block repeats to be performed, and
- a controller connected to said block start address register, said block end address register, said comparator and said block count register, said controller responsive to dispatch of a block repeat instruction to said instruction execution unit to
  - load a block start address indicated by said block repeat instruction into said block start address register,
  - load a block end address indicated by said block repeat instruction into said block end address register,
  - load a number of block repeats indicated by said block repeat instruction into said block count register, said controller further operable to
- decrement said block count register each time said comparator indicates a match,
- when said comparator indicates a match and said block repeat count register is not zero, connecting said block start address register to said second input of said selector,
- when said comparator indicates a match and said block repeat count register is zero, ending a block repeat, and said loop control unit supplying a pseudo branch instruction to said instruction execution unit when said comparator indicates a match and said block repeat count register is not zero upon a first execution of a loop; and a branch prediction unit connected to said instruction fetch unit and said instruction execution unit, said branch prediction unit, said branch prediction unit storing a branch address, a target address and prediction data for conditional branch instructions executed by said instruction execution unit, said branch prediction unit supplying said target address for a current conditional branch instruction to said third input of said selector and supplying a control signal to said control input of said selector dependent upon said prediction data for a current conditional branch instruction and said branch prediction unit storing a branch address, a target address and prediction data corresponding said pseudo branch instruction.

2. A digital data processor operable to execute conditional branch instructions to branch to a branch address upon satisfaction of branch condition and a block repeat instruction specifying a number of times to execute a block of instructions from a block start address to a block end address comprising:

an instruction fetch unit including
- a program counter fetch register storing a next instruction address to be fetched from a memory having an input for storing a specified address and an output generating said address stored therein,
- an adder having a first input connected to said output of said program counter fetch register, a second input receiving an instruction fetch width and an output generating a sum of said first and second inputs, and
- a selector having a first input connected to said output of said adder, second and third inputs, a control input and an output, said selector connected a selected one of said first, second and third inputs to said output dependent upon a control signal at said control input;

an instruction execution unit connected to said instruction fetch unit performing data processing operations corresponding to instructions fetched by said instruction fetch unit, that executes the instructions obtained by said instruction fetch unit, a loop control unit including
- a block start address register storing the address of a start instruction of a repeated block of instructions,
- a block end address register storing the address of an end instruction of a repeated block of instructions,
- a comparator having a first input connected to said block end address register, a second input responsive to an address of an instruction next to be dispatched to said instruction execution block and an output indicating whether the first and second inputs match,
- a block count register storing a number of block repeats to be performed, and
- a controller connected to said block start address register, said block end address register, said comparator and said block count register, said controller responsive to dispatch of a block repeat instruction to said instruction execution unit to
  - load a block start address indicated by said block repeat instruction into said block start address register,
  - load a block end address indicated by said block repeat instruction into said block end address register,
  - load a number of block repeats indicated by said block repeat instruction into said block count register, said controller further operable to
- decrement said block count register each time said comparator indicates a match,
- when said comparator indicates a match and said block repeat count register is not zero, connecting said block start address register to said second input of said selector,
- when said comparator indicates a match and said block repeat count register is zero, ending a block repeat, and said loop control unit indicating to said instruction fetch unit a loop ending and advancing to a next instruction following said block end address when said comparator indicates a match and said block repeat count register is zero;

said loop control unit supplying a pseudo branch instruction to said instruction execution unit when said comparator indicates a match and said block repeat count register is not zero upon a first execution of a loop; and a branch prediction unit connected to said instruction fetch unit and said instruction execution unit, said branch prediction unit, said branch prediction unit storing a branch address, a target address and prediction data for conditional branch instructions executed by said instruction execution unit, said branch prediction unit supplying said target address for a current conditional branch instruction to said third input of said selector and supplying a control signal to said control input of said selector dependent upon said prediction data for a current conditional branch instruction and said branch prediction unit storing a branch address, a target address and prediction data corresponding said pseudo branch instruction.

3. The digital data processor of claim 2, wherein:

said branch prediction unit does not store a branch address, a target address or prediction data corresponding said loop ending branch.

4. The digital data processor of claim 2, further comprising:

an instruction queue storing instructions fetched by said instruction fetch unit not yet dispatched to said instruction execution unit; and wherein said instruction execution unit generates an actual branch address upon resolution of said branch condition;

said loop control unit erases the instructions in said instruction queue upon supplying a loop ending branch to said instruction fetch unit.

\* \* \* \* \*